United States Patent [19]

Speakman

[11] Patent Number: 4,771,627

[45] Date of Patent: Sep. 20, 1988

[54] STRESS-COINING APPARATUS AND METHOD

[75] Inventor: Eugene R. Speakman, Fullerton, Calif.

[73] Assignee: McDonnell Douglas Corporation, Long Beach, Calif.

[21] Appl. No.: 924,413

[22] Filed: Oct. 29, 1986

[51] Int. Cl.$^4$ .............................................. B21D 39/08
[52] U.S. Cl. ...................................... 72/479; 72/710; 72/370; 29/446; 29/90.01
[58] Field of Search ................. 72/391, 370, 479, 709, 72/710, 393; 29/157.3 C, 446, 523, 90 R; 411/968, 455

[56] References Cited

U.S. PATENT DOCUMENTS

| | | | |
|---|---|---|---|
| 1,466,953 | 9/1923 | Loomis | 29/90 R |
| 2,726,704 | 12/1955 | Fischer | 72/391 |
| 3,434,327 | 3/1969 | Speakman | 72/377 |
| 3,470,729 | 10/1969 | Andrs | 72/479 |
| 3,779,127 | 12/1973 | Speakman | 411/968 |
| 3,951,561 | 4/1976 | Speakman | 411/455 |
| 4,129,028 | 12/1978 | Leftheris et al. | 72/370 |
| 4,282,734 | 8/1981 | Eddy | 72/370 |
| 4,299,519 | 11/1981 | Corbett | 72/391 |
| 4,573,340 | 3/1986 | Kammeraad | 72/479 |

FOREIGN PATENT DOCUMENTS 250639 8/1969 U.S.S.R. .............................. 72/370
471144 5/1975 U.S.S.R. .............................. 72/479

Primary Examiner—David Jones
Attorney, Agent, or Firm—Max Geldin

[57] ABSTRACT

A stress coining tool for fatigue life extension of the wall of an aperture in a metallic structural member, in the form of a rigid elongated member having a plurality of annular olive-like protuberances of a progressively larger diameter from one end of the member, and an additional olive-like protuberance of a smaller diameter than the largest protuberance, such additional protuberance located on the opposite side of the largest protuberance from the other protuberances. The diameter of the largest annular protuberance is such that the material forming the wall of the aperture is displaced radially elastically and plastically an amount to provide stress coining and to minimize stress concentration in the wall of the aperture. The additional olive-like protuberance to the rear of the largest protuberance is of a diameter such that the latter protuberance functions as a guide to permit passage of the tool back through the aperture without causing any further plastic deformation of the wall of the aperture. The elongated member is provided with a serrated pole stem which permits attachment of the tool to a rivet gun in conjunction with a mechanism thereon for rapid force vibration of the tool to impact it through the aperture, and then to impact it back through the aperture.

15 Claims, 2 Drawing Sheets

STRESS-COINING APPARATUS AND METHOD

BACKGROUND OF THE INVENTION

This invention relates to reduction of fatigue failure in a metal structural member, particularly in an area adjacent to an aperture, such as a drilled hole therein, and is especially concerned with the provision of novel stress coining apparatus and procedure for fatigue life extension of structural members.

A fatigue failure in a structural member is usually a gradual or progressive fracture resulting from fluctuating loads. The fracture starts at some point in the structural member at which the stress is much larger than anticipated. This high localized stress causes a small crack which then gradually separates as the flexing movement imparted to the structure is repeated, until the entire member ruptures without measurable yielding. It is well-known in this type of failure that the inclusion of an aperture therein, such as a drilled hole for the insertion of a fastening member, creates an area for the derivation of a high localized stress.

Thus, in a structural member having an aperture formed by any one of the conventional ways, as by drilling or reaming, a stress pattern normally develops in conjunction with the aperture wherein the lines of stress tend to converge toward the center of the aperture, so that as tensile stress is applied to the structural member, the magnitude of the force will be concentrated upon the aperture. In other words, the weakest portion of the member is in the area of the aperture.

A method and device for stress coining to increase fatigue strength and to minimize the stress concentration generated by an aperture in a metallic structure are disclosed in Applicant's U.S. Pat. Nos. 3,434,327 and 3,779,127. In Applicant's U.S. Pat. No. 3,951,561, there is disclosed a stress coining tool for increasing the fatigue strength of a metallic structural member having an aperture therein, comprising a rigid elongated shaft adapted for forcible insertion through the aperture, and provided with a plurality of different diameter, olive-shaped annular protuberances spaced intermediate the end portions, the protuberances being progressively larger in diameter from one end of the shaft. The largest of the protuberances has a diameter of such a relation to the diameter of the aperture that upon a forced insertion thereof through the aperture, the material forming the wall of the aperture is displaced radially substantially the difference between the diameter of the largest annular protuberance and the diameter of the aperture. The displaced material is thereafter allowed to rebound approximately one-half of the initial material displacement. As the result of such stress coining of the aperture, the lines of stress in the stress pattern of the member do not converge on the aperture and tend to flow around the aperture. Since the lines of force are not concentrated at any single point, the structural member functions substantially as a non-apertured member.

However, in using the prior art stress coining tools, it is often necessary to have access to the backside of the structural component through which the stress coining tool is passed. This limits the use of the tool since in many instances, the area adjacent the backside of the part is so limited as to prevent access thereto. Where there is insufficient access to the backside of the part, the stress coining tool cannot be pulled back through the stress coined aperture without further plastically expanding the hole and adversely affecting the stress coined characteristics of the structural member adjacent the aperture, wherein the lines of stress have been previously altered by the stress coining operation so that they do not converge on the aperture but tend to flow around the aperture.

It is accordingly an object of the present invention to provide an improved stress coining apparatus and procedure, which permits operation of the stress coining apparatus from only one side of a structural component.

Another object is the provision of a stress coining tool and procedure which permits insertion of the stress coining tool through an aperture on one side of the structural member, and pulling the tool back through the stress coined aperture, without adversely affecting the improved fatigue life characteristics of the initially stress coined aperture.

Yet another object of the invention is to provide means in conjunction with an improved stress coining tool, and procedure, for vibrating tool, into and through an aperture in a structural member and then back through the resulting stress coined aperture, rapidly and without any elastic deformation of the stress coined aperture.

SUMMARY OF THE INVENTION

The above objects are achieved according to the invention by the provision of a stress coining tool for increasing the fatigue strength of a metallic structural member having an aperture therein, such tool comprising a substantially rigid elongated member having a plurality of annular olive-like protuberances (olives) of a progressively larger diameter from one end of the member, and an additional olive-like protuberance (olive) of a smaller diameter than the largest protuberance, such additional protuberance located on the opposite side of the largest protuberance from the other protuberances. When the tool is forced into an aperture of a structural member, the progressively larger protuberances are of a size with respect to the aperture so as to elastically and plastically deform the hole and increase the diameter thereof. The diameter of the largest annular protuberance is such that the material forming the wall of the aperture is displaced radially substantially the difference between the diameter of the largest annular protuberance and the diameter of the aperture, the displaced material being thereafter allowed to rebound approximately one-half of the initial material displacement, to provide stress coining, and minimizing stress concentration in the wall of the aperture.

The additional olive-like protuberance to the rear of the largest protuberance, is of a diameter which has essentially no plastic deformation effect on the wall of the aperture, as the tool is passed through the hole during the stress coining procedure. However, following passage of the tool through the aperture to effect stress coining, the additional protuberance to the rear of the largest protuberance, functions as a guide to permit passage of the tool back through the aperture. The diameter or size of the additional protuberance is such that although some elastic deformation of the aperture may occur as the tool is passed back through the aperture, no plastic deformation of the wall of the aperture occurs, and the tool is retracted through the aperture without adversely affecting the stress coined characteristics of the aperture.

Further, the presence of the additional olive-like protuberance on the tool traps lubricant, normally placed on such tool, in the valley between itself and the adjacent largest protuberance, to insure that the part adjacent the aperture is properly lubricated to prevent galling of the aperture.

According to one embodiment, the elongated member or pin has three olive-like protuberances of a progressively larger diameter proceeding from adjacent the forward end of the pin and one additional olive-like protuberance adjacent the largest olive on the other side thereof toward the rear, such additional olive having a diameter slightly larger than the diameter of the initially stress coined aperture, but smaller than the size of the largest olive.

The above novel stress coining tool is provided with a serrated pole stem which permits attachment of the tool to a rivet gun in conjunction with means thereon for rapid force vibration of the tool to impact it through the aperture, and then to impact it back through the aperture.

The present invention thus provides an improved stress coining system which is versatile and can be employed for almost every application, whereas the prior art stress coining systems require access to the backside of the structural part.

DESCRIPTION OF THE PREFERRED EMBODIMENTS

Figure 1:
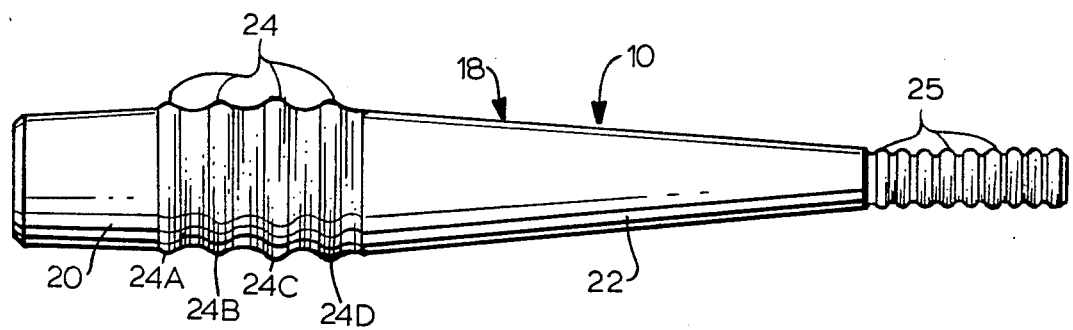
FIG. 1 is a side elevational view showing one embodiment of the stress coining tool of the invention.
Figure 2:
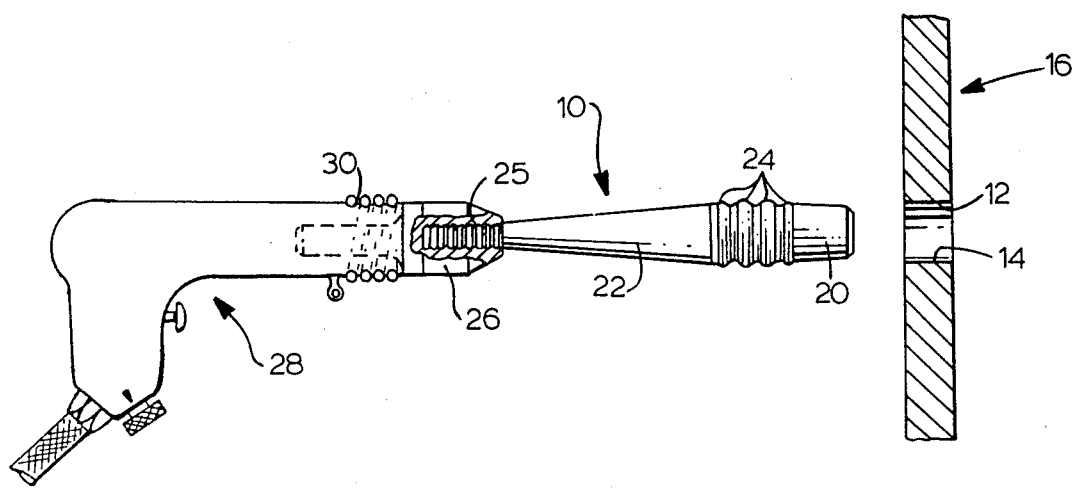
FIG. 2 shows the stress coining tool of FIG. 1 mounted in a rivet gun.

Referring to FIGS. 1 and 2 of the drawings, there is shown an embodiment of the invention comprising a stress coining tool 10 for minimizing stress concentration in the wall 12 of an aperture 14 formed in a metallic structural member 16. The stress coining tool 10 is a substantially rigid, elongated member or pin 18 made of a suitable steel alloy or other metal harder than the material of the structural member 16. The stress coining tool 10 has a pilot or front end portion 20 and a shank end portion 22, and a plurality of olive-shaped annular protuberances 24, here shown as four in number, positioned intermediate the end portions. The front end portion 20 has a diameter slightly smaller than the diameter of the aperture 14, so that the tool 10 can be easily inserted therein and guided through the aperture. The size and shape of the annular protuberances 24 are important characteristics of the invention device since not only do they provide the means to stress coin the aperture 14, but in combination, they assure that the tool 10 follows the proper straight path through the aperture 14, in the forward direction, and the tool is guided back through the aperture when the tool is retracted following the stress coining operation.

The first annular protuberance or olive 24A is usually slightly larger than the diameter of the aperture 14. The second and third annular protuberances 24B and 24C are progressively enlarged diametrically in relatively small increments of about 0.002 inch from the initial protuberance 24A to the third protuberance 24C. The third protuberance or olive 24C has a diameter of such predetermined relationship to the diameter of the aperture 14 is displaced or deformed radially, both plastically and elastically an amount equalling substantially the difference between the diameter of the third annular protuberance or olive 24C and the diameter of aperture 14, and thereafter, the displaced material rebounds approximately one-half of the initial material displacement. Thus, the material forming the wall 12 is deformed plastically an amount that about equals its elastic deformation as the first three olives 24A, 24B and 24C are forced therethrough.

The fourth olive 24D is smaller in size or diameter than olive 24C, so that when the aperture has been expanded plastically by the largest olive 24C, the next or fourth olive 24D does not accomplish any further plastic deformation of the aperture. The function of the fourth olive 24D is to permit feeding the tool 10 back through the aperture following the initial stress coining operation and to permit the aperture to maintain its elastic deformation, but with no further plastic expansion of the aperture. Since it is not desired to expand the aperture to any material degree while the tool is driven back through the aperture, the fourth olive 24D functions essentially as a guide, and the size or diameter of the fourth olive 24D can be about the same as the second olive 24B on the opposite side from the largest olive.

Ideally, the first olive 24A is sized to plastically deform the aperture and elastically deform it a third of the final deformation, and the next olive 24B is sized to deform another third, and the olive 24C is sized to deform another third. Since the final deformation of the aperture has been accomplished by the third olive 24C, the fourth olive 24D simply deforms the aperture elastically as the tool is driven back and acts as a guide, so that the tool can be pulled back. In the absence of the fourth olive 24D functioning as a guide for driving the stress coining tool back through the aperture, it would be difficult to maintain the pin 18 straight in the aperture, and the pin would move off center and jam sideways, deforming the circular aperture.

The end portion 22 of the tool is in the form of a pole sten having serrations 25 on the end thereof. The serrated end of the pole stem is arranged to fit into a collet 26 of a rivet gun 28, or a "Drivematic" machine equipped with a vibrator driving force to the stress coining tool 10 to forcibly insert the stress coining tool 10 through the aperture 14 and, thereafter, for applying a continuous vibratory force to drive the stress coining tool back through the aperture.

The stress coining tool 10 must have a fine, highly polished finish if optimum fatigue life improvement of the structural member 16 is to be obtained. To reduce friction, the stress coining tool 10 may be heavily lubricated, and the reduced diameter areas adjacent the protuberances or olives 24 from reservoirs for such lubricant. As the olives 24 pass through the aperture 14, the aperture wall 12 elastically recovers into the reduced diameter areas between the olives 24 to pick up the lubricant. These reservoirs, therefore, assure that there is proper lubrication between the aperture wall 12 and the olives 24, even when the aperture 14 is relatively deep. The use of a rivet gun aids in providing more consistent lubrication as the tool is driven forward and back through the aperture, the vibratory nature of the rivet gun assisting in uniformly distributing the lubricant.

By use of a serrated pole stem 22 integrally mounted on the stress coining tool 10, and a collet 26 positioned in the end of the rivet gun for mounting the pole stem of the tool 10, as shown in FIG. 2, the rivet gun is enabled to vibrate the stress coining tool in a forward direction through the aperture 14 of the structural member 16, and also is able to vibrate the tool back, by applying vibratory force to the serrations 25.

Thus, the invention concept resides particularly in the features of the addition of the fourth annular protuberance 24D and its size with respect to the largest protuberance or olive 24C and with respect to the size of the stress coined aperture, the addition of a pole stem to the rivet gun to enable it to drive the stress coining tool both forward and backward, and the method of vibrating the tool, both to forcibly push the tool through the aperture and to forcibly pull the tool back through the aperture with the same rivet gun. In this manner, it is unnecessary to have access to the backside of the structural member for purposes of stress coining an aperture therein.

Figure 3:
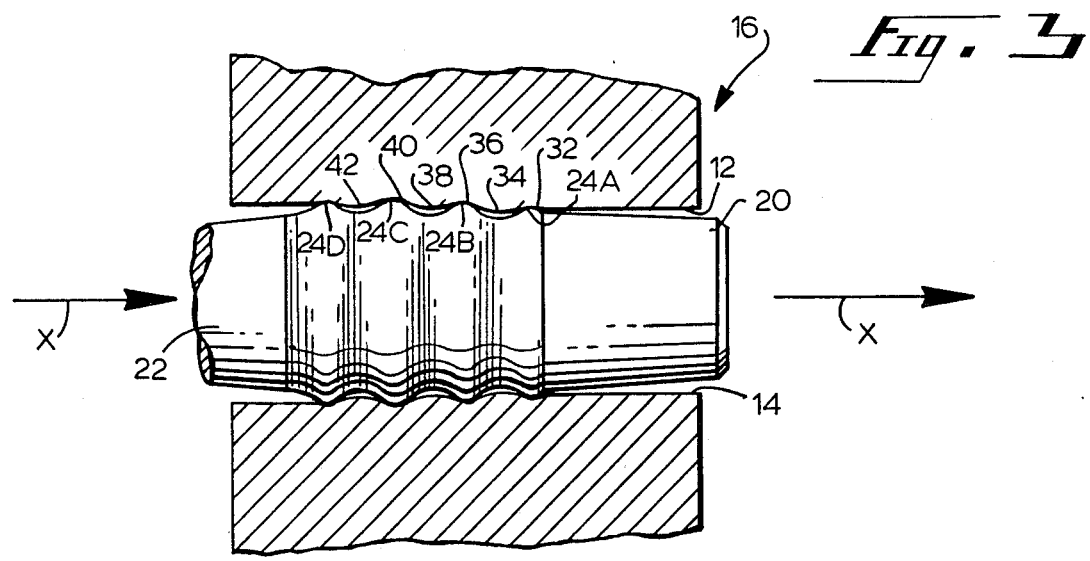
FIG. 3 is an illustration showing the effect on the aperture when driving the stress coining tool through the aperture in the forward direction.

In FIG. 3, there is illustrated the effect on the aperture of the forced insertion of the tool through the aperture 14 in the direction indicated by the arrows X. It is seen that the smallest olive 24A which first enters the aperture, expands the wall of the aperture a small amount, as indicated at 32, and the diameter of the aperture only recovers a fractional amount, as indicated at 34. The next olive 24B expands the aperture 14 further, as indicated at 36, and again, the diameter of the aperture only recovers a fractional amount, as indicated at 38. Finally, the largest olive 24C expands the aperture still further, as indicated at 40, and again, the diameter of the aperture only recovers a fractional amount, as indicated at 42. The displaced material will rebound approximately one-half of the initial displacement. Thus, if the hole is initially expanded 0.006 inch elastically and plastically by the largest olive 24C, it will rebound one-half that amount, that is, to 0.003 inch. The wall of the aperture is finally displaced radially, both elastically and plastically, substantially the difference between the diameter of the largest protuberance or olive 24C and the diameter of the aperture. The fourth olive 24D, which is approximately of the same diameter as 24B, and which is slightly larger than the diameter of the stress coined aperture, has essentially no plastically deforming effect on the size of the stress coined aperture although some elastic deformation may occur. The stress coining operation establishes a ring of residual compressive stress in the metal, causing the theoretical lines of stress to spread around the aperture rather than pass through it, thus substantially increasing the fatigue life of the part.

Figure 4:
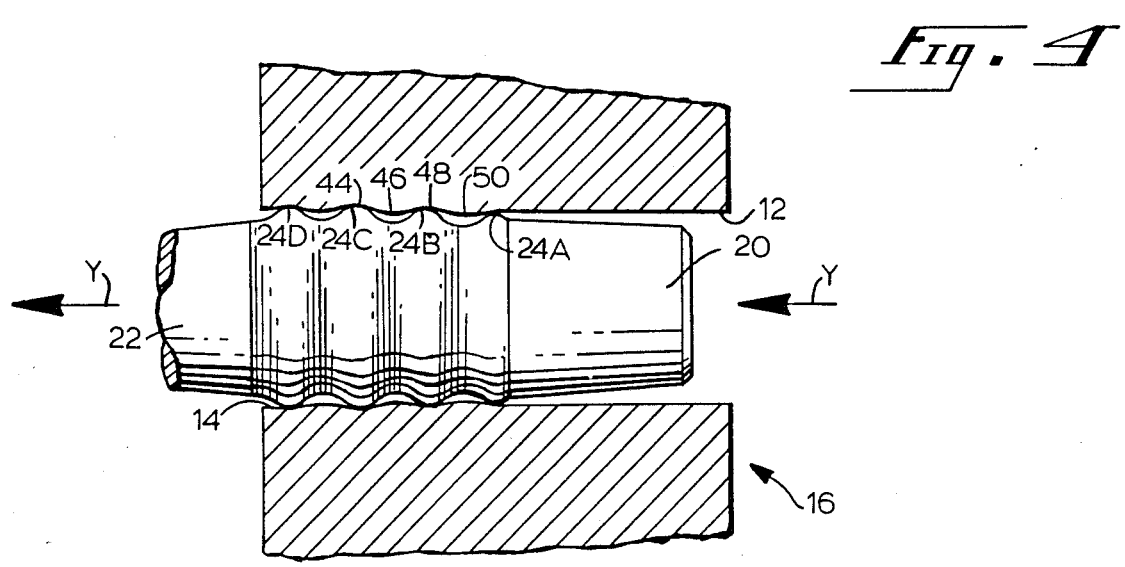
FIG. 4 is an illustration showing the effect on the aperture when the stress coining tool is driven back through the aperture in the opposite direction.

Now referring to FIG. 4, showing passage of the stress coining tool back through the stress coined aperture in the opposite direction illustrated by arrows Y, it will be seen that the rear or fourth olive 24D is of a diameter just somewhat larger than the diameter of the stress coined aperture 14 and serves to guide the tool through the aperture, without any plastic deformation thereof. When being driven back through the aperture, it will be noted that the largest olive 24C expands the aperture elastically, as seen at 44, but the elastic deformation permits the metal to spring back after passage of the large olive 24C, almost to the initial diameter of the stress coined aperture, as shown at 46. The olive 24B expands the aperture elastically a smaller amount, as seen at 48, but the elastic deformation permits the metal to spring back after passage of such olive, approximately to the initial diameter of the stress coined aperture, as shown at 50. It is noted that the rear olive 24A may barely touch the wall 12 of the stress coined aperture 14.

It will be understood that any number of annular protuberances or olives can be employed, provided that the majority of the olives have a progressively increasing diameter, and that at least one annular protuberance or olive be positioned on the opposite side of the largest diameter olive, the size and shape of the olives of progressively increasing diameter being sufficient to provide the means to stress coin the aperture, and at least one olive on the other side of the largest diameter olive being of a size which permits guidance of the stress coining tool back through the aperture while only imparting minor elastic deformation on the aperture during such passage.

Stress coin hole expansion, according to the invention, increases the fatigue strength of close tolerance holes for bolts, rivets, bushings and bearings. The invention process commences with an undersized hole that is plastically expanded to the final diameter with a lubricated expanding pin. The present invention is adaptable to apertures in any thickness of structural material, such as aluminum. The aperture is expanded to final dimensions by driving the coining pin with a steady slow driving force through the aperture, and with a similar driving force for retraction of the coining pin, using a modified rivet gun to which the pin is connected.

Various further changes and modifications can be made in the invention without departing from the spirit of the invention. Hence, the invention is not to be taken as limited except by the scope of the appended claims.

What is claimed is:

1. A stress coining tool for minimizing stress concentration and increasing fatigue strength in a wall of an aperture formed in a metallic structural member, which comprises a rigid elongated member having a front and rear end portions and a plurality of olive-shaped annular protuberances positioned intermediate said end portions, said protuberances being progressively enlarged diametrically in a direction leading away from said front end portion, whereby the largest of said protuberances has a diameter of a size which causes said largest protuberance to elastically and plastically deform an aperture when the tool is inserted therein, and only one additional olive-shaped annular protuberance positioned adjacent said largest protuberance on the opposite side thereof from the other protuberances, and having a diameter smaller than that of said largest protuberance, whereby said one additional protuberance functions as a guide to pull the tool back through the aperture.

2. The stress coining tool of claim 1, whereby each of said plurality of said protuberances has a diameter larger than the diameter of said aperture, all of said plurality of protuberances elastically and plastically deforming said aperture when the tool is inserted therein, said one additional protuberance having a diameter which only elastically deforms the aperture.

3. The stress coining tool of claim 1, the diameter of said one additional protuberance being approximately equal to the diameter of one of said plurality of protuberances on the opposite side of said largest protuberance.

4. The stress coining tool of claim 1, whereby the diameter of said one additional protuberance is slightly larger than the diameter of the stress coined aperture.

5. The stress coining tool of claim 1, whereby said front end portion has a diameter smaller than said aperture for insertion of the tool in said aperture, said rear end portion comprised of a serrated pole stem for attachment to a rivet gun for forced vibratory motion of said tool forward through said aperture and forced vibratory motion of said tool back through said aperture.

6. The stress coining tool of claim 1, said plurality of olive-shaped protuberance consisting essentially of four said protuberances, three of said protuberances being progressively enlarged diametrically in a direction leading away from said front end portion, the fourth protuberance being said one additional protuberance and positioned adjacent the largest protuberance on the opposite side thereof from the first and second protuberances.

7. A stress coining tool for minimizing stress concentration and increasing fatigue strength in a wall of an aperture formed in a metallic structural member, which comprises
   a rigid elongated pin having a front end portion and a rear end portion,
   four olive-shaped protuberances positioned intermediate said end portions,
   three of said protuberances being progressively enlarged diametrically in a direction leading away from said front end portion,
   the fourth protuberance being positioned adjacent to the largest third protuberance of said progressively enlarged protuberances on the opposite side thereof from the first and second protuberances,
   whereby each of said three progressively enlarged protuberances has a diameter larger than the diameter of said aperture, and elastically and plastically deforming said aperture when the tool is inserted therein,
   the diameter of said fourth protuberance being approximately equal to the diameter of the second protuberances adjacent the largest protuberances and on the opposite side thereof,
   said fourth protuberance functioning as a guide to pull the tool back through the aperture.

8. The stress coining tool of claim 7, whereby said front end portion of said pin has a diameter smaller than said aperture for insertion of the tool in said aperture, said rear end portion comprised of a serrated pole stem for attachment to a rivet gun for forced vibratory motion of said tool forward through said aperture and forced vibratory motion of said tool back through said aperture.

9. In combination, the stress coining tool of claim 5, and a rivet gun, including means on said rivet gun receiving the serrated pole stem of said stress coining tool and permitting forced vibratory motion of said tool forward through said aperture and forced vibratory motion of said tool back through said aperture, without requiring access to the opposite side of said metallic sructural member.

10. In combination, the stress coining tool of claim 8, and a rivet gun, including means comprising a collet on said rivet gun, receiving the serrated pole stem of said stress coining tool and means permitting driving of said tool forward through said aperture and withdrawal of said tool back through said aperture without requiring access to the opposite side of said metallic structural member.

11. A stress coining process for minimizing stress concentration and increasing fatigue strength in a wall of an aperture formed in a metallic member, which comprises vibrating the tool of claim 1 through said aperture with a rivet gun, and elastically and plastically deforming the aperture an amount which substantially reduces the stress concentration in the wall of said aperture, and vibrating said tool back through said aperture with the same rivet gun without adversely affecting the stress characteristics in the wall of said aperture, and wherein said at least on protuberance on said tool guides the tool back through the aperture.

12. The process in claim 11, wherein said stress coining tool is mounted on said rivet gun so as to permit both forward and backward vibration of said tool through said aperture.

13. The process in claim 12, wherein each of the protuberances of progressively enlarged diameter elastically and plastically deforms the aperture during forward vibration of said tool through said aperture, the displaced material rebounding approximately one-half of the initial displacement.

14. The process of claim 13, wherein said one additional protuberance on said tool only elastically deforms the aperture during backward vibration of the tool through said aperture.

15. A stress coining process for minimizing stress concentration and increasing fatigue strength in a wall of an aperture formed in a metallic member, which comprises
   mounting the stress coining tool of claim 7 on a rivet gun adapted to drive said tool in either a forward or reverse direction,
   driving and vibrating said tool forward through said aperture, the three protuberances of progressively enlarged diameter on said tool elastically and plastically deforming the aperture an amount which substantially reduces the stress concentration in the wall of said aperture, and
   driving and vibrating said tool back through said aperture with the same rivet gun without adversely affecting the stress characteristics in the wall of said aperture, said fourth protuberance on said tool having a diameter which permits guidance of the tool back through the aperture while only elastically deforming the aperture.

* * * * *